United States Patent
Chen et al.

(10) Patent No.: US 11,364,497 B2
(45) Date of Patent: Jun. 21, 2022

(54) EMBEDDED MICROFLUIDIC DEVICES

(71) Applicant: HEWLETT-PACKARD DEVELOPMENT COMPANY, L.P., Spring, TX (US)

(72) Inventors: Chien-Hua Chen, Corvallis, OR (US); Michael W. Cumbie, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 141 days.

(21) Appl. No.: 16/645,200

(22) PCT Filed: Oct. 12, 2017

(86) PCT No.: PCT/US2017/056396
§ 371 (c)(1),
(2) Date: Mar. 6, 2020

(87) PCT Pub. No.: WO2019/074512
PCT Pub. Date: Apr. 18, 2019

(65) Prior Publication Data
US 2021/0170401 A1 Jun. 10, 2021

(51) Int. Cl.
*B01L 3/00* (2006.01)
*G01N 21/64* (2006.01)

(52) U.S. Cl.
CPC .... *B01L 3/502715* (2013.01); *G01N 21/6454* (2013.01); *B01L 2200/027* (2013.01);
(Continued)

(58) Field of Classification Search
CPC .. B01L 3/502715; B01L 3/5027; B01L 3/502; B01L 3/50; B01L 2200/027;
(Continued)

(56) References Cited

U.S. PATENT DOCUMENTS 7,828,417 B2 * 11/2010 Haluzak ................ B41J 2/1623
347/50
8,383,060 B2 2/2013 Dekker
(Continued)

FOREIGN PATENT DOCUMENTS

EP 2062644 5/2009
RU 2521639 7/2014
(Continued)

OTHER PUBLICATIONS

Clausen, C.H. et al, Coplanar Electrode Layout Optimized for Increased Sensitivity for Electrical Impedance Spectroscopy, Dec. 30, 2014.
(Continued)

*Primary Examiner* — Christine T Mui
(74) *Attorney, Agent, or Firm* — Fabian VanCott

(57) ABSTRACT

A microfluidic system includes, in an example, a substrate and at least two microfluidic devices embedded into the substrate, at least one of the microfluidic devices being different from a remaining number of microfluidic devices. A microfluidic apparatus includes at least two microfluidic devices embedded into a substrate, at least a first microfluidic device of the microfluidic devices being heterogenous to at least a second microfluidic device of the microfluidic devices and a microfluidic channel to fluidically couple the microfluidic devices to each other.

20 Claims, 5 Drawing Sheets

(52) U.S. Cl.
CPC . *B01L 2300/041* (2013.01); *B01L 2300/0663* (2013.01); *B01L 2400/043* (2013.01)

(58) Field of Classification Search
CPC ........... B01L 2200/02; B01L 2300/041; B01L 2300/0663; B01L 2400/043; B01L 2400/0403; B01L 2400/04
USPC .............................. 422/82.05, 502, 501, 500
See application file for complete search history.

(56) References Cited

U.S. PATENT DOCUMENTS

| | | |
|---|---|---|
| 9,128,028 B2 | 9/2015 | Mcbrady |
| 2003/0026740 A1 | 2/2003 | Staats |
| 2005/0130226 A1* | 6/2005 | Ahn ................. G01N 33/54353 435/7.1 |
| 2011/0020141 A1 | 1/2011 | Van Zon |
| 2015/0093815 A1 | 4/2015 | Kiani |

FOREIGN PATENT DOCUMENTS

| | | |
|---|---|---|
| WO | WO-2001002093 | 1/2001 |
| WO | WO-2008024319 | 2/2008 |

OTHER PUBLICATIONS

Errico, V. et al, Mitigating Positional Dependence in Coplanar Electrode Coulter-type Microfluidic Devices, Aug. 2017, <http://www.sciencedirect.com/science/article/pii/S0925400517304525>.

\* cited by examiner

EMBEDDED MICROFLUIDIC DEVICES

BACKGROUND

Various sensing devices are currently available for sensing different attributes of fluid, such as blood. In some cases, a microfluidic apparatus incorporating microfluidic devices are used to analyze an analyte. This microfluidic device may allow a fluid to pass by a sensing device in order to accomplish that analysis.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
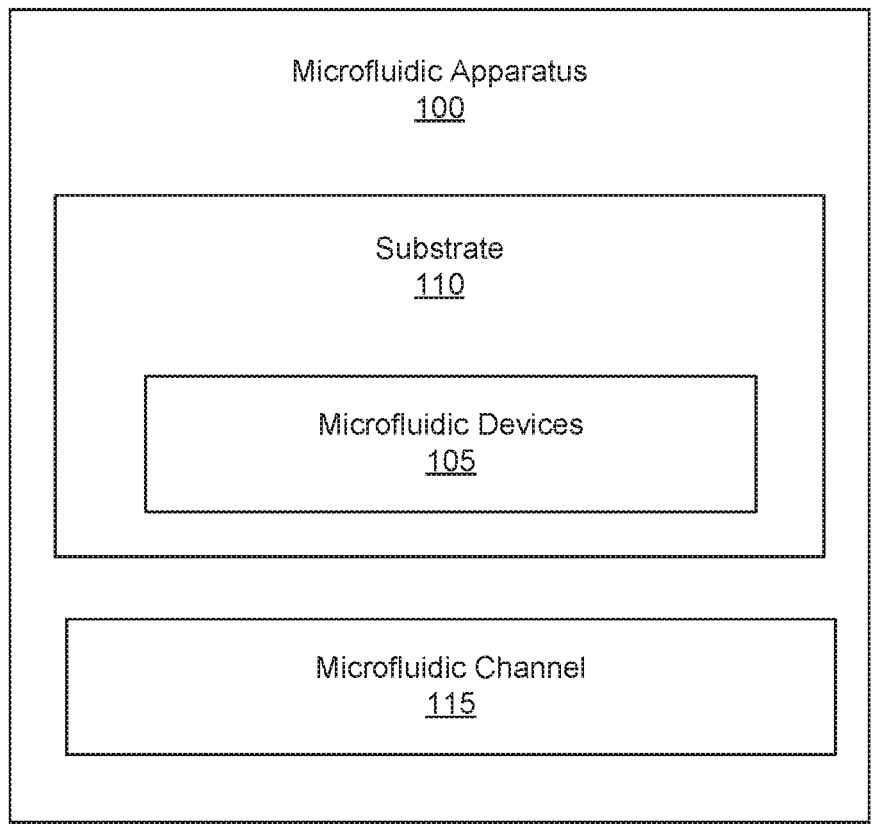
FIG. 1 is a block diagram of a microfluidic apparatus according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Microfluidic apparatus that incorporate microfluidic devices are often fabricated on the sub-millimeter scale. These microfluidic devices often deal with the behavior, precise control, and/or manipulation of fluids that are geometrically constrained at this sub-millimeter scale. As a consequence of such small scales, microfluidic devices may consume energy at a relatively lower rate than non-micro scale analyzing devices as well as, in some cases, be disposable.

In some examples, the microfluidic apparatus may include channels to direct a fluid towards the microfluidic devices in the channel. In these examples, the fluid flow should be maintained such that smooth fluidic flow from one microfluidic device to another may be realized. Without this smooth fluidic flow, an analyte may not be analyzed appropriately.

Additionally, the microfluidic devices may be distinct from one another with each or, at least two of the microfluidic devices being made of different materials, fabrication processes, and/or shapes. Forming these distinct microfluidic devices into a single co-planar package allows for multi-physic integration of the microfluidic devices reducing the cost of manufacture.

The present specification, therefore, describes a microfluidic apparatus that includes at least two microfluidic devices embedded into a substrate, at least a first microfluidic device of the microfluidic devices being heterogenous to at least a second microfluidic device and a microfluidic channel to fluidically coupling the microfluidic devices to each other.

The present specification also describes a microfluidic system that includes a substrate and at least two microfluidic devices embedded into the substrate, at least one of the microfluidic devices being different from a remaining number of microfluidic devices.

The present specification further describes a microfluidic fluid analyzer that includes at least two microfluidic devices embedded into the substrate, microfluidic devices being co-planar to each other, a cap formed over the embedded microfluidic devices, the cap forming a microfluidic channel between the embedded microfluidic devices and the cap.

FIG. 1 is a block diagram of a microfluidic apparatus (100) according to an example of the principles described herein. The microfluidic apparatus (100) may include a substrate (110) with a number of microfluidic devices (105) embedded therein and a microfluidic channel (115) to fluidically couple the microfluidic devices (105) to each other.

The substrate (110) may be any type of substrate (110) into which the microfluidic devices (105) may be embedded. In an example, the substrate (110) is epoxy mold compound (EMC). In an example, the substrate (110) is formed into a single layer to embed the microfluidic devices (105) therein.

The microfluidic devices (105) may be any type of active or passive microfluidic devices (105). Examples of active microfluidic devices (105) include integrated circuits (ICs), thermal inkjet dies, Piezo printhead dies, sensors, actuators, microelectromechanical systems (MEMS), heaters, light-emitting diodes (LEDs), lasers, electrodes, among others. Examples of passive microfluidic devices (105) includes waveguides, lead frames, cooling plates, tubes, antennas, mechanical filters, printed circuit boards (PCBs), molded components, radio-frequency identification (RF ID) tags, lead zirconate titanate (PZT) devices, among others. Consequently, the present specification describes a microfluidic apparatus (100) that provides for multi-physic integration of heterogeneous or diverse microfluidic devices (105) into the microfluidic apparatus (100).

In addition to each of the microfluidic devices (105) being diverse as to their functionality, they may also be diverse as to the materials used to make each of the microfluidic devices (105). The present specification, therefore, contemplates that each of the microfluidic devices (105) are made from different materials respective of each other. Thus, embedding each of the microfluidic devices (105) into the substrate (110) allows for this diversity of materials among the microfluidic devices (105) to be used. The materials used to make each of the microfluidic devices (105) may include plastics, ceramics, metals, and silicon, among other types of materials. This results in a relatively more inexpensive microfluidic apparatus (100) than would similar devices that were made within a silicon wafer, for example.

The microfluidic devices (105) may each be embedded into the substrate (110) such that the microfluidic devices (105) are each co-planar to each other. In an example, this allows for a relatively smoother fluid flow over the microfluidic devices (105) as well as from microfluidic device (105) to microfluidic device (105). During use of the microfluidic apparatus (100), this may allow for better analysis of an analyte passed by the microfluidic devices (105). The placement of the microfluidic devices (105) within the substrate (110) also allows for the integration of the microfluidic devices (105) made with different materials, fabrication processes, of shapes. Consequently, the co-planar nature of the embedded microfluidic devices (105) allows for a number of different types of analytical devices being made within the microfluidic apparatus (100).

The microfluidic apparatus (100) may further include a microfluidic channel (115). In an example, the microfluidic channel (115) is formed between the co-planar microfluidic devices (105) and a lid. The lid may be made of any type of material that allows for a smooth microfluidic channel (115) to be formed in order to provide for analysis of an analyte that passes over the co-planar microfluidic devices (105). In an example, the lid includes an input port that allows an analyte to pass into the microfluidic channel (115) and past the co-planar microfluidic devices (105). In an example, the lid of the microfluidic apparatus (100) includes both an input port and an output port to allow an analyte to pass entirely through the microfluidic channel (115) and away from the co-planar microfluidic devices (105) and out of the microfluidic channel (115).

The diversity of the microfluidic devices (105) allows for a number of different microfluidic apparatus (100) that can receive different analytes and perform different analysis on those analytes. In an example, the microfluidic devices (105) may include optical sensors and/or capacitors with each of the optical sensors including a diverse number of band pass filters to detect different wavelengths of electromagnetic radiation and the capacitors to detect, for example, the ionic properties of the analyte. The microfluidic apparatus (100) that includes these diverse number of band pass filters may detect properties of the analyte via detection of reflected and/or emitted light from the analyte. In this example, the optical transparence, optical absorption, and/or ionic content of the analyte may be detected.

In an example, the microfluidic devices (105) may include at least two microfluidic devices (105) that are spaced apart from each other along the microfluidic channel (115) at a certain distance. In this example, a flow viscosity of an analyte passing through the microfluidic channel (115) may be detected. In this example, the flow viscosity of the analyte is the distance between the microfluidic devices (105) divided by the time delay when the analyte contacts a first microfluidic device (105) and when the analyte contacts at least a second microfluidic device. Additional microfluidic devices (105) may be included along the microfluidic channel (115) such that an average flow viscosity may be calculated based on when the analyte contacts each of the microfluidic devices (105). In an example, as the analyte comes in contact with the first microfluidic device (105), an "analyte in" event may be triggered. Accordingly, as the analyte touches each of the successive number of microfluidic devices (105), a "fluid pass" event may be triggered. With this information, the viscosity may be calculated as described herein. Because the distance between the first and at least second microfluidic device (105) is decided at manufacture as well as the characteristics of the microfluidic channel (115) generally, the viscosity of the analyte may be determined. In an example, the first microfluidic device (105) may also be capable of heating the analyte as the analyte passes over the first microfluidic device (105). In this example, the at least second microfluidic device (105) may measure the temperature of the analyte thereby determining the change in temperature as the analyte passes through the microfluidic channel (115). This information may be used to determine other characteristics of the analyte besides or in addition to the viscosity of the analyte.

In an example, the microfluidic devices (105) may include at least two semiconductor laser and sensor microfluidic devices (105). In this example, the analyte may absorb the electromagnetic radiation emitted from the semiconductor laser microfluidic devices (105) and reemit a secondary wavelength of electromagnetic radiation that indicates a certain property of the analyte exists. The number of sensor microfluidic devices (105) may then detect this secondary wavelength of electromagnetic radiation in order to determine the composition of the analyte. This microfluidic apparatus (100) may therefore, detect the presence of quantum dots, dyes, and/or molecules present in the analyte. In an example, this microfluidic apparatus (100) may determine whether a chemical reaction had taken place or to what extent that chemical reaction had taken place upstream of the microfluidic devices (105). Such process may be used in the detection of deoxyribonucleic acid (DNA) sampling and provide further information regarding the (DNA).

In an example, the microfluidic devices (105) may include a microfluidic device (105) that prepare an analyte for further analysis, mixing, and/or reaction with another substance. The microfluidic apparatus (100), in an example, may include a permanent or electromagnetic magnets that are embedded co-planarly in the substrate (110). In this example, the magnet may be used as a trap for magnetic beads. In some instances, these beads may be prepared and surface activated prior to being introduced into the microfluidic apparatus (100) and/or microfluidic channel (115). The activated beads, usually on the scale of microns in diameter, may be used as receptors of certain chemicals or biofluids in the analyte. The beads may be trapped by the magnets in order to extract a certain chemical or portion of the analyte via elution of the received on the surface of the beads. The portion of the analyte resulting from the elution process may then be carried downstream of the microfluidic devices (105) and microfluidic channel (115) for further analysis or manipulation.

In any of the examples described herein, the microfluidic apparatus (100) may further comprise a redistribution layer (RDL) or any other type of electrical trace layer that provides electrical or signal connectivity between the microfluidic devices (105) and/or to other devices outside of, inside of, or otherwise associated with the microfluidic apparatus (100). In an example, the RDL may be embedded into the substrate (110) as well or otherwise made to be co-planar with the microfluidic devices (105). In an example, the RDL is not co-planar with the microfluidic devices (105).

Each of the microfluidic devices (105) described herein may also provide a function. In some examples, the microfluidic devices (105) may be a combination of any of the herein-mentioned microfluidic devices (105) that analyze the analyte passing through the microfluidic channel (115). Additionally, although the microfluidic devices (105) have been described in connection with being placed within a single microfluidic channel (115) formed by a lid, the present specification contemplates the use of a microfluidic channels (115) either in series or parallel to each other with each microfluidic channel (115) including its own microfluidic devices (105). Still further, the microfluidic apparatus (100) may be in the form of a cassette that interfaces with, for example, a fluid ejection controller. In this example, the fluid ejection controller may be communicatively coupled to the RDLs providing energy and signals to the cassette and microfluidic devices (105) as well as receiving data from the microfluidic devices (105). In an example, the cassette may further include a fluid ejection device that ejects an amount of fluid into, for example, an assay plate after being analyzed by the microfluidic devices (105). In any of the examples, an outside power source such as the fluid ejection controller may selectively provide power and data signals to the microfluidic devices (105) through the use of a processor. The processor may execute computer readable program code that directs energy and signals to the microfluidic devices (105) in order to, at least, analyze the analyte passing through the microfluidic channel (115).

Figure 2:
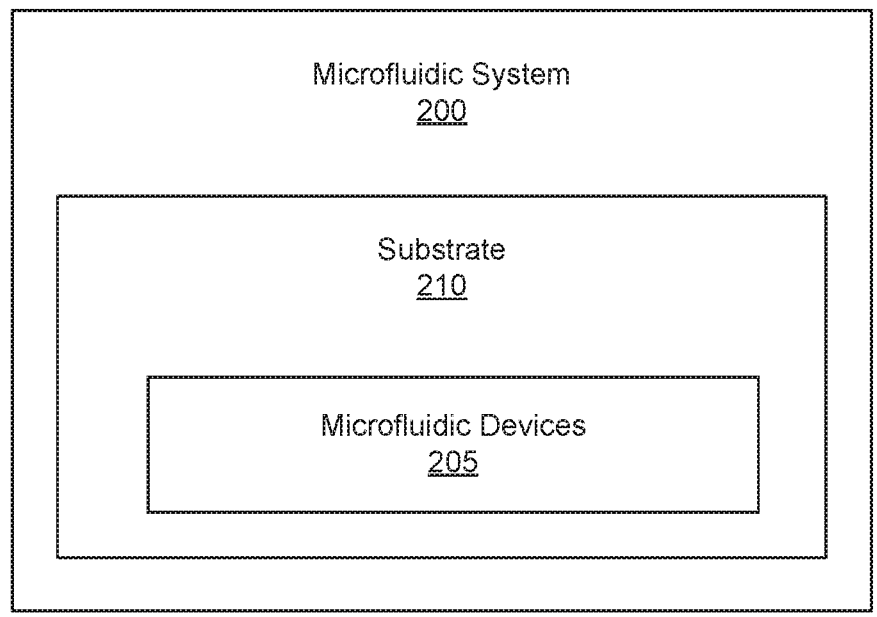
FIG. 2 is a block diagram of a microfluidic system according to an example of the principles described herein.

FIG. 2 is a block diagram of a microfluidic system (200) according to an example of the principles described herein. In this example, the microfluidic system (200) may include a substrate (210) with microfluidic devices (205) embedded therein. As described above, the substrate (210) may be any type of substrate (210) that provides for each of the microfluidic devices (205) to be individually embedded therein. In an example, the substrate (210) is EMC.

The microfluidic devices (205) may be embedded into the substrate (210) such that each of the microfluidic devices (205) are co-planar with respect to each other. By embedding each of the microfluidic devices (205) co-planarly, fluidic flow of an analyte over the microfluidic devices (205) can be made to be relatively constant but for the properties of the analyte itself. As in the example where the microfluidic devices (205) measure fluidic flow and/or viscosity, the co-planar layout of the microfluidic devices (205) will not alter or disrupt the flow of the analyte over the microfluidic devices (205).

Examples of the microfluidic devices (205) may include those examples described herein. Each of the microfluidic devices (205) may further be formed such that each of the microfluidic devices (205) execute multiple functions in order to analyze the analyte.

In an example, the analyte flowing over the microfluidic devices (205) may be contained within a microfluidic channel formed by a lid placed over and parallel to the microfluidic devices (205). In an example, the microfluidic system (200) may include more than one microfluidic channel with each of the microfluidic channels including microfluidic devices (205). In an example, the microfluidic channels may be in series such that an analyte is analyzed by a more than one set of microfluidic devices (205). In an example, the microfluidic channels may be parallel with respect to each other such that an analyte is analyzed by more than one set of microfluidic devices simultaneously or nearly simultaneously.

As described herein, the microfluidic system (200) may include a cassette housing the microfluidic devices (205) and a fluid ejection controller that controls, at least, the functioning of the microfluidic devices (205). In this example, the fluid ejection controller may include a processor that serves as a signal source and controls energy provided to each of the microfluidic devices (205). Because, in an example, at least one of the microfluidic devices (205) may be a fluid ejection device, the processor of the fluid ejection controller may cause the fluid ejection device to selectively eject an analyte form the cassette and into, for example, an assay plate.

Figure 3:
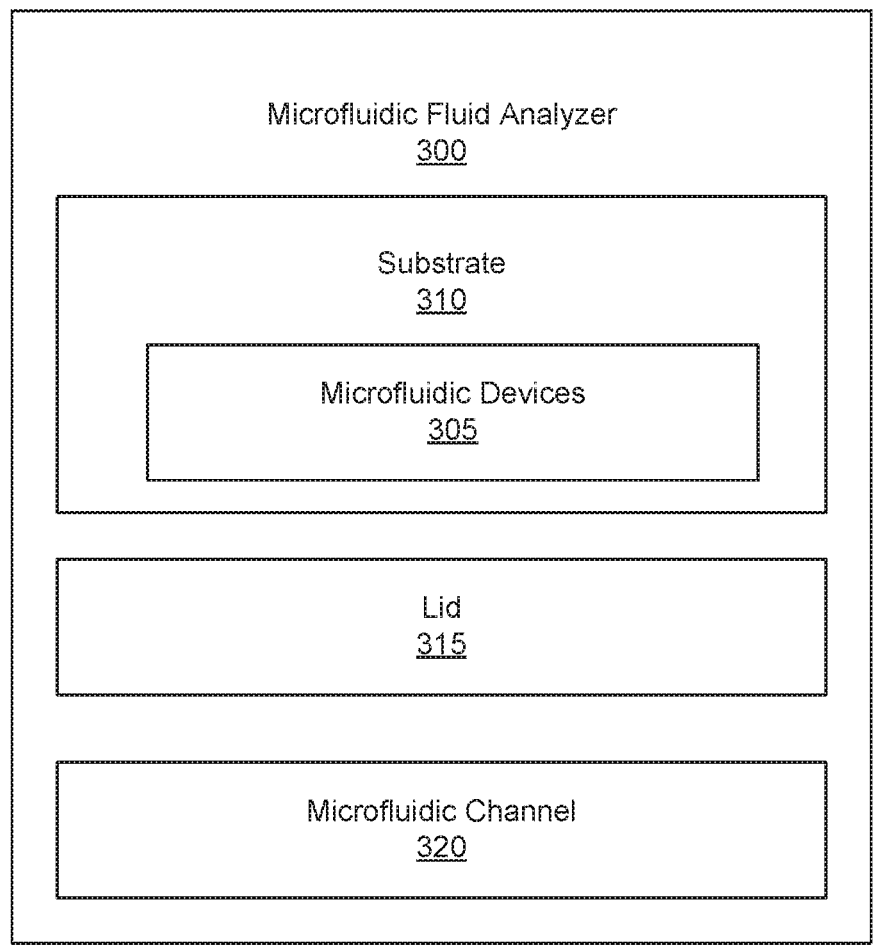
FIG. 3 is a block diagram of a microfluid fluid analyzer according to an example of the principles described herein.

FIG. 3 is a block diagram of a microfluid fluid analyzer (300) according to an example of the principles described herein. The microfluid fluid analyzer (300) may include at least two microfluidic devices (305) embedded into a substrate (310). Similar to other examples described herein, the microfluidic devices (305) may be embedded into the substrate (310) such that the microfluidic devices (305) are co-planar to each other. Additionally, the substrate (310) may be, in an example, made of EMC.

The microfluid fluid analyzer (300) may further include a lid (315). The lid (315) may be made of any material that can contain an analyte within a microfluidic channel (320) formed between the interface of the lid (315) and the microfluidic devices (305). In an example, the lid (315) may be made of EMC.

As described above, the microfluidic devices (305) may be divers among each other in both function and form. In an example, the microfluidic devices (305) may be any number of fluid flow sensors used to measure the flow of an analyte passing through the microfluidic channel (320). These fluid flow sensors may also measure the viscosity of the analyte as it flows through the microfluidic channel (320).

In an example, the microfluidic devices (305) may be light emitting devices, light sensing devices, or combinations thereof. In an example, at least one of the microfluidic devices (305) may be a combination of a light emitting device and light sensing device. During use of the microfluid fluid analyzer (300), the analyte passing through the microfluidic channel (320) may be excited using a specific wavelength of light emitted by the light emitting device. Any light reemitted from the analyte may be detected by the light sensing device and details about the composition of the analyte may be inferred or determined from that reemitted light. In an example, reactions that should have taken place in the analyte upstream of the microfluidic channel (320) may be detected using the light emitting and light sensing devices.

In an example, the microfluidic devices (305) may be a number of magnetic devices used to trap a number of ferromagnetic balls within the analyte passing through the microfluidic channel (320). As described herein, these balls may be chemically activated so as to eventually extract a certain chemical or portion of the analyte via elution of the received on the surface of the balls.

Figure 4:
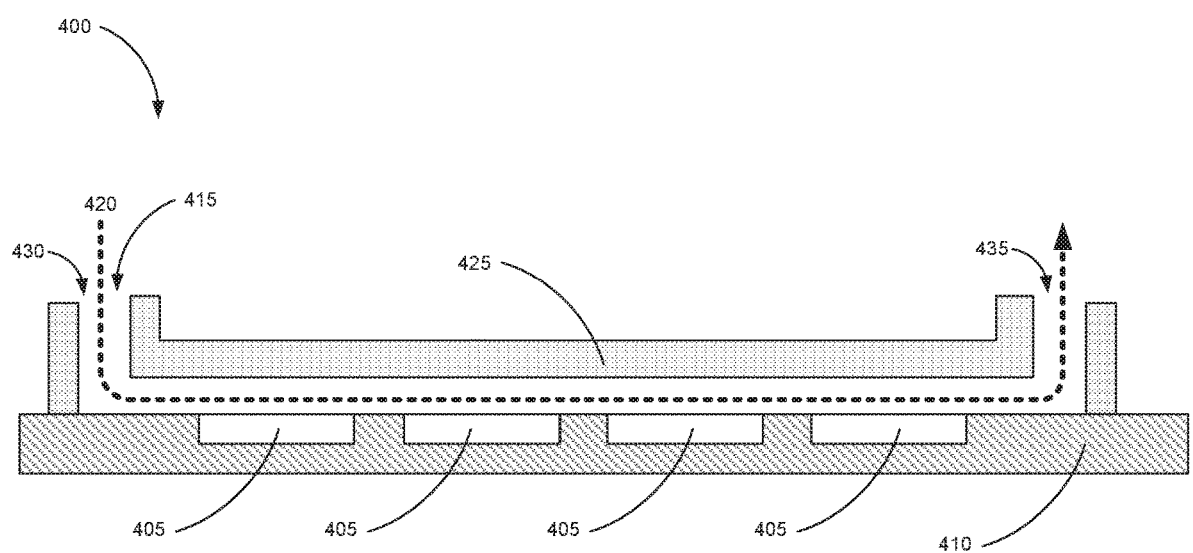
FIG. 4 is a block side cutout view of a microfluidic system according to an example of the principles described herein.

FIG. 4 is a block side cutout view of a microfluidic system (400) according to an example of the principles described herein. The microfluidic system (400) includes at least two microfluidic devices (405) embedded into a substrate (410). As shown in FIG. 4, the microfluidic devices (405) are co-planar with respect to each other with each of an upper portion of the microfluidic devices (405) lying on the same plane. Additionally, the microfluidic devices (405) may each be co-planar to an upper surface of the substrate (410). As described herein, the co-planar nature of the microfluidic devices (405) to each other and/or to the substrate (410) allows for a determinable flow of an analyte through the microfluidic channel (415).

Again, the microfluidic devices (405) may each be different among each other and in an example, may provide multiple function during operation of the microfluidic system (400). During operation, these microfluidic devices (405) may interact with the analyte as described herein. As the analyte passes through the microfluidic channel (415) in the direction of the dotted line (420), the microfluidic devices (405) may analyze the analyte as described herein.

As described herein, the microfluidic system (400) may further include a lid (425). The lid (425) may help form the microfluidic channel (415) defined between the substrate (410) with its microfluidic devices (405). In an example, the lid (425) has both an input port (430) and an output port (435). In some examples, an input port (430) may be formed in the lid (425) while an output port (435) is not formed into the lid (425).

Figure 5:
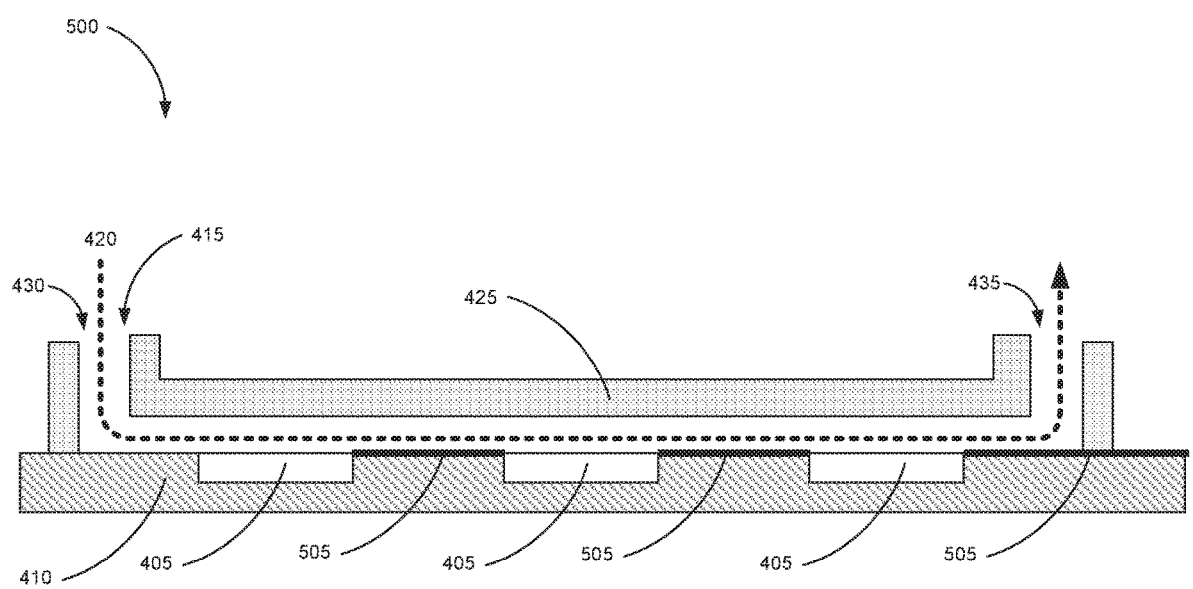
FIG. 5 is a block side cutout view of a microfluidic system (500) according to an example of the principles described herein.

FIG. 5 is a block side cutout view of a microfluidic system (500) according to an example of the principles described herein. The microfluidic system (500) may include similar features as those described in connection with FIG. 4. The microfluidic system (500) may include at least two microfluidic devices (405) embedded in a substrate (410) co-planarly. A lid (425) may also be placed over the microfluidic devices (405) with the lid having an input port (430) and an output port (435). The lid (425), input port (430), and output port (435) form a fluid flow path as indicated by the dotted line (420). Additionally, the microfluidic system (500) may include a redistribution layer (RDL) (505) that electrically couples each of the microfluidic devices (405) to each other and to an electrical and/or signal source. The RDL (505) may be co-planar to the microfluidic devices (405).

The specification and figures describe a microfluidic device, system, and apparatus that includes microfluidic devices embedded into a substrate. The microfluidic devices are each different from each other allowing for an analyte to be analyzed as the analyte passes over the microfluidic devices. The microfluidic device, system, and apparatus further includes a lid that is placed over the microfluidic devices thereby forming a microfluidic channel between the lid and the co-planar microfluidic devices. Placing the microfluidic devices in a co-planar manner allows for smooth fluidic flow from one microfluidic device to the another in the microfluidic device, system, and apparatus. The microfluidic devices are heterogenous with respect to at least one of the other microfluidic devices. Because the heterogeneous microfluidic devices are embedded in the substrate, the cost is reduced allowing for more complexity of microfluidic devices to be embedded into the substrate without the entire substrate being made of silicon. Additionally, the heterogenous microfluidic devices can be embedded into the substrate, each of the microfluidic devices may be made of different materials thereby further increasing the complexity and functionality of the microfluidic system, device, or apparatus. As a result, a wide array of different life science applications can be realized through the use of the heterogeneous microfluidic devices.

The preceding description has been presented to illustrate and describe examples of the principles described. This description is not intended to be exhaustive or to limit these principles to any precise form disclosed. Many modifications and variations are possible in light of the above teaching.

What is claimed is:

1. A microfluidic apparatus, comprising:
   at least two microfluidic devices embedded into a substrate such that an upper surface of each microfluidic device is exposed at an upper surface of the substrate while a remainder of each microfluidic device is surrounded by the substrate, at least a first microfluidic device of the microfluidic devices being heterogeneous to at least a second microfluidic device of the microfluidic devices; and
   a microfluidic channel to fluidically couple the microfluidic devices to each other, the microfluidic channel comprising the upper surface of the substrate over which fluid flows to reach each of the microfluidic devices embedded in the substrate;
   wherein each microfluidic device is to receive fluid via the microfluidic channel and perform a different function involved in analyzing an analyte in the fluid.

2. The microfluidic apparatus of claim 1, wherein the microfluidic devices are embedded into a single layer.

3. The microfluidic apparatus of claim 2, wherein the single layer is epoxy mold compound.

4. The microfluidic apparatus of claim 1, wherein the microfluidic devices are co-planar with respect to each other.

5. The microfluidic apparatus of claim 1, wherein the microfluidic channel is formed over the co-planar microfluidic devices using a lid attached to the substrate over the microfluidic devices.

6. The microfluidic apparatus of claim 1, further comprising an output port to allow a fluid to pass out of the microfluidic channel.

7. A microfluidic system, comprising:
   a substrate;
   at least two microfluidic devices embedded into the substrate such that an upper surface of each microfluidic device is exposed at an upper surface of the substrate while a remainder of each microfluidic device is surrounded by the substrate, at least one of the microfluidic devices being different from a remaining number of microfluidic devices;
   a microfluidic channel to fluidically couple the microfluidic devices to each other, the microfluidic channel comprising the upper surface of the substrate over which fluid flows to reach each of the microfluidic devices embedded in the substrate;
   wherein each microfluidic device is to receive fluid via the microfluidic channel and perform a different function involved in analyzing an analyte in the fluid; and
   a conductive layer that electrically couples the microfluidic devices to each other, the conductive layer being formed on the upper surface of the substrate.

8. The microfluidic system of claim 7, wherein the microfluidic devices are co-planar with respect to each other.

9. The microfluidic system of claim 8, further comprising a lid, the lid forming part of the microfluidic channel above the co-planar microfluidic devices.

10. The microfluidic system of claim 9, wherein the lid comprises an input port and an output port for the microfluidic channel.

11. The microfluidic system of claim 7, wherein at least one of the microfluidic devices comprises an optical sensor comprising different band pass filters to detect different wavelengths of light.

12. A microfluidic fluid analyzer, comprising:
    at least two microfluidic devices embedded into a substrate such that an upper surface of each microfluidic device is exposed at an upper surface of the substrate while a remainder of each microfluidic device is surrounded by the substrate, the microfluidic devices being co-planar to each other and with the upper surface of the substrate; and
    a lid formed over the embedded microfluidic devices, the lid and the upper surface of the substrate forming a microfluidic channel between the embedded microfluidic devices where fluid flows over the upper surface of the substrate to reach each of the microfluidic devices embedded in the substrate;
    wherein each microfluidic device is to receive fluid via the microfluidic channel and perform a different function involved in analyzing an analyte in the fluid.

13. The microfluidic fluid analyzer of claim 12, further comprising at least two fluid flow sensors.

14. The microfluidic fluid analyzer of claim 12, further comprising a light emitting device and light sensing device.

15. The microfluidic fluid analyzer of claim 12, further comprising at least two magnetic devices.

16. The microfluidic apparatus of claim 5, wherein the lid comprises an input port and an output port of the microfluidic channel.

17. The microfluidic apparatus of claim 1, further comprising a redistribution layer that electrically couples the microfluidic devices to each other, the redistribution layer being formed on the upper surface of the substrate.

18. The microfluidic apparatus of claim 1, wherein one of the microfluidic devices to conduct an optical analysis of the analyte in the fluid.

19. The microfluidic apparatus of claim 1, wherein one of the microfluidic devices to conduct an electrical analysis of the analyte in the fluid.

20. The microfluidic apparatus of claim 1, wherein one of the microfluidic devices comprises magnets to attract magnetic beads configured to extract a portion of the analyte by elution.

* * * * *